United States Patent

Mori et al.

[11] Patent Number: 5,948,879
[45] Date of Patent: Sep. 7, 1999

[54] MALEIMIDE-BASED COPOLYMER AND RESIN COMPOSITION COMPRISING THE SAME

[75] Inventors: Hiroshi Mori; Yasuaki Ii; Hisaya Yokohama; Yasunori Tsuneshige, all of Otake; Seizo Fujii, Kawasaki; Takanori Nakazato, Otake, all of Japan

[73] Assignee: Mitsubishi Rayon Co., Ltd., Tokyo, Japan

[21] Appl. No.: 08/957,588

[22] Filed: Oct. 24, 1997

Related U.S. Application Data

[63] Continuation of application No. 08/513,845, filed as application No. PCT/JP95/00013, Jan. 10, 1995, abandoned.

[30] Foreign Application Priority Data

| Jan. 10, 1994 | [JP] | Japan | 6-000989 |
| Apr. 1, 1994 | [JP] | Japan | 6-065147 |
| Jun. 30, 1994 | [JP] | Japan | 6-170358 |
| Aug. 4, 1994 | [JP] | Japan | 6-201545 |

[51] Int. Cl.$^6$ ............................. C08G 69/08; C08G 73/10
[52] U.S. Cl. .................. 528/310; 528/322; 526/329.1; 526/325; 526/346; 525/294; 525/295; 525/309; 525/329.4; 525/330.3; 525/333.2; 525/333.3; 524/559; 524/565; 524/571
[58] Field of Search .................... 528/310, 322; 524/559, 565, 571; 525/294, 295, 309, 329.4, 330.3, 333.2, 333.3; 526/329.1, 325, 346

[56] References Cited

U.S. PATENT DOCUMENTS 5,475,061 12/1995 Machida et al. .................. 525/247

FOREIGN PATENT DOCUMENTS

| 0 509 459 A1 | 10/1992 | European Pat. Off. |
| 2-138321 | 5/1990 | Japan |
| 4359944 | 12/1992 | Japan |
| 598104 | 4/1993 | Japan |
| 5-163268 | 6/1993 | Japan |
| 5214201 | 8/1993 | Japan |

*Primary Examiner*—P. Hampton-Hightower
*Attorney, Agent, or Firm*—Oblon, Spivak, McClelland, Maier & Neustadt, P.C.

[57] ABSTRACT

A maleimide-based copolymer containing maleimide monomer units (a-1), aromatic vinyl monomer units (a-2) and other vinyl monomer units (a-3), wherein, (I) the content of residual maleimide monomer in the copolymer is 0.1% by weight or less, and the content of whole volatiles other than the maleimide monomer is 0.5% by weight or less;

(II) a compound obtained from at least one monomer selected from the group consisting of a maleimide monomer, an aromatic vinyl monomer and other vinyl monomers, having a weight-average molecular weight of from 200 to 1,000, is contained in an amount of 2 to 10% by weight;

(III) the copolymer has a yellow index of 30 or less; and (IV) the copolymer has an intrinsic viscosity of from 0.3 to 1.5. Maleimide-based resin composition comprising the above maleimide-based copolymer (A) and a rubber-based graft polymer (B) obtained by polymerizing at least one vinyl monomer selected from the group consisting of an aromatic vinyl monomer, an acrylic or methacrylic ester monomer and a derivative thereof and a vinyl cyanide monomer in the presence of 5 to 80% by weight of a rubber-like polymer.

12 Claims, No Drawings

MALEIMIDE-BASED COPOLYMER AND RESIN COMPOSITION COMPRISING THE SAME

This application is a Continuation of application Ser. No. 08/513,845, filed on Sep. 11, 1995, now abandoned, which was filed as International Application No. PCT/JP95/00013, filed on Jan. 10, 1995.

TECHNICAL FIELD

The present invention relates to a maleimide-based copolymer and a resin composition comprising the same which are excellent in heat resistance, transparency and mechanical strength as well as in processability.

BACKGROUND ART

In the fields of electrical appliances, automobiles, etc., importance of the products placing emphasis on design esthetics is increasing recently. The material used therefor is also required to have high mechanical performance, light weight and good appearance to conform to such a trend. As an answer to such a request, in the field of materials where transparency is required, there have been developed and used polycarbonate resins belonging to the field of material called engineering plastics, and SMI resins which are copolymers of styrene and N-phenylmaleimide. These resins have excellent heat resistance, but they are inferior to the conventional AS resins in moldability, and are also unsatisfactory in terms of price. It is especially remarkable that the recent resin products have complicate configurations to meet the esthetic request and are also increasingly thin-sectioned for the lightweight and compact design, so that ease of handling in molding and processing is attracting attention as a part of performance of the material from the aspects of improvement of yield, energy saving and resources saving. From such a viewpoint, pursuit of a novel resin material that can meet both requirements for easy handling like AS resins which have been utilized in the wide fields of industries and for high heat resistance like engineering plastics has been made.

Further, to answer the above request, modified polyphenylene ethers and heat resistance-improved version of ABS resins, or so-called heat-resistant ABS resins, have been developed and used. Particularly heat-resistant ABS resins, for which various methods of improvement have been developed, are advantageous in moldability, weather resistance and cost over other engineering plastics and widely used as heat resistant resin material. In order to improve heat resistance of AS resin moiety in ABS resin, there is generally employed a so-called graft blending method in which an acrylonitrile-styrene-α-methylstyrene terpolymer obtained by polymerizing acrylonitrile, styrene with α-methylstyrene or an acrylonitrile-styrene-α-methylstyrene-N-phenylmaleimide quadripolymer is blended with a rubber-reinforced resin to form a resin composition. In this case, since containing α-methylstyrene is an essential factor for the improvement of heat resistance, there arises the problem that when the content of this monomer is small, no satisfactory heat resistance can be obtained, and when its content is large, since the polymerization rate is lowered, it is difficult to obtain a resin with high degree of polymerization, and there is produced a chain structure which tends to cause thermal decomposition during processing. A heat-resistant ABS resin using a maleimide-based copolymer for the purpose of eliminating said disadvantage caused by use of α-methylstyrene has been developed (JP-A-61-16955, etc.).

Also, resin compositions using specific maleimide-based copolymers for providing maleimide-based copolymer resin compositions with excellent impact resistance are disclosed in JP-A-2-51514 and JP-A-2-196849.

However, maleimide-based copolymers, although high in heat resistance, have the disadvantage in that they are poor in molding processability as they are low in fluidity in the molten state as compared with conventional AS resins. For improving molding process-ability, usually a plasticizer, a lubricant, etc., are added, but this gives rise to the problems such as the necessity of uniformalizing dispersion of the additives in the resin, and exudation of the additives onto the surface of the molded product during the molding and processing to spoil appearance of the molded product or reduce its heat resistance contrary to the original object.

The resin used in the field of exterior parts of vehicles such as lamp housing of automobile needs to be a thermoplastic resin which has excellent heat and weather resistance in addition to impact resistance. A typical example of impact-resistant thermoplastic resin is ABS resin.

Recently, for the purpose of enhancing heat resistance of ABS resin, there is used a maleimide-based copolymer produced by copolymerizing a maleimide compound, used as matrix resin, with an unsaturated cyanogen compound and an aromatic vinyl compound. To combat poor processability of heat-resistant ABS resin incorporated with said maleimide-based copolymer, it has been proposed to use a maleimide-based copolymer containing an oligomer such as disclosed in Japanese Patent Application No. 6-989.

On the other hand, ABS resin has the defect that it is poor in weather resistance because of use of polybutadiene, which is a conjugated diene rubber and susceptible to decomposition by ultraviolet ray, as rubber component. For improving the weather resistance, AAS resin using an acrylic ester rubber as rubber component is used, but AAS resin is inferior to ABS resin in impact resistance. For the purpose of improving impact resistance of AAS resin, use of a rubber obtained by compounding a minor amount of a conjugated diene rubber and a major amount of an acrylic ester rubber, such as disclosed in JP-B-3-66329, has been proposed to make a specific AAS resin.

Therefore, as means for obtaining a thermoplastic resin having excellent heat and weather resistance, it appears effective to blend a maleimide-based copolymer and the specific AAS resin.

However, the thermoplastic resin composition obtained by blending a maleimide-based copolymer and the specific AAS resin, although having heat and weather resistance, has the problem that the surface appearance of the molded product is deteriorated. That is, it has the problem of causing cloudiness or partial disappearance of gloss or nonuniform gloss, referred to comprehensively as defective appearance, of the surface of the molded product.

DISCLOSURE OF INVENTION

In view of the above circumstances, the present inventors have pursued further researches on the maleimide-based copolymers and resin compositions comprising such copolymers having excellent molding processability without compromising heat resistance and, as a result, attained the present invention.

Thus, the essentials of the present invention reside in a resin composition containing a maleimide-based copolymer (A) comprising 10 to 65% by weight, preferably 15 to 65% by weight of maleimide monomer units (a-1), 35 to 85% by weight of aromatic vinyl monomer units (a-2) and 35% by weight or less of other vinyl monomer units (a-3) (the total of said units (a-1) to (a-3) being 100% by weight), characterized in that:

(I) the content of the residual maleimide monomer in said copolymer is 0.1% by weight or less, and the content of overall volatiles other than maleimide monomer is 0.5% by weight or less;

(II) there is contained 2 to 10% by weight of a compound obtained from at least one monomer selected from the group consisting of a maleimide monomer, an aromatic vinyl monomer and other vinyl monomers, the weight-average molecular weight of said compound measured by gel permeation chromatography (GPC) falling in a range of 200 to 1,000;

(III) yellow index of said copolymer is 30 or less; and (IV) intrinsic viscosity of said copolymer is 0.3 to 1.5, and a rubber-based graft copolymer (B).

Best Mode for Carrying Out the Invention

As the maleimide monomer used in the present invention, there can be mentioned maleimide, N-methylmaleimide, N-ethylmaleimide, N-propylmaleimide, N-isopropylmaleimide, N-cyclohexylmaleimide, N-phenylmaleimide, N-toluylmaleimide, N-xylylmaleimide, N-naphthylmaleimide, N-t-butylmaleimide, N-ortho-chlorophenylmaleimide, N-orthomethoxyphenylmaleimide, N-orthobromophenylmaleimide and the like. Of these monomers, N-cyclohexylmaleimide, N-orthochlorophenyl-maleimide, N-orthobromomaleimide and N-phenylmaleimide are preferred, and N-phenylmaleimide is especially preferred. These maleimide monomers may be used either singly or as a combination of two or more of them.

The content of maleimide monomer units (a-1) in the maleimide-based copolymer of the present invention is in a range of 10 to 65% by weight, preferably 15 to 65% by weight, or 10 to 50% by weight, more preferably 20 to 50% by weight. When the content of the maleimide monomer units is less than 10% by weight, heat resistance of the copolymer, which is to be improved in the present invention, is low, and when the content exceeds 65% by weight, there arise the problems such that fluidity is deteriorated to make it unable to obtain a desired molded product, or the resin becomes frangible to cause crack of the molded product when it is removed from the mold.

As the aromatic vinyl monomer used in the present invention, there can be mentioned styrene, α-methylstyrene, paramethylstyrene, t-butylstyrene, chlorostyrene, bromostyrene, vinyltoluene and the like. Of these monomers, styrene is preferred. These aromatic vinyl monomers may be used either singly or as a combination of two or more of them.

The content of aromatic vinyl monomer units (a-2) in the maleimide-based copolymer of the present invention is in a range of 35 to 85% by weight, preferably 40 to 70% by weight. When the content of the aromatic vinyl monomer units is less than 15% by weight, the obtained maleimide-based copolymer is low in fluidity and poor in molding processability, and when the content exceeds 85% by weight, the obtained copolymer is low in heat resistance.

As other vinyl monomers usable as optional component (a-3) in the present invention, vinyl cyanide monomers, acrylic ester monomers, methacrylic ester monomers, unsaturated dicarboxylic acid anhydride monomers and vinylcarboxylic monomers can be mentioned. As the vinyl cyanide monomers, acrylonitrile, methacrylonitrile, fumaronitrile, etc., can be mentioned, acrylonitrile being preferred. As the acrylic ester monomers, methyl acrylate, ethyl acrylate, propyl acrylate, butyl acrylate, cyclohexyl acrylate, etc., can be mentioned. As the methacrylic ester monomers, methyl methacrylate, ethyl methacrylate, propyl methacrylate, butyl methacrylate, phenyl methacrylate, isobornyl methacrylate, benzyl methacrylate, trichloroethyl methacrylate, etc., can be mentioned, methyl methacrylate being preferred. As the unsaturated dicarboxylic acid anhydride monomers, maleic anhydride, itaconic anhydride, citraconic anhydride, etc., can be mentioned, maleic anhydride being preferred. As the vinylcarboxylic monomers, acrylic acid, methacrylic acid, etc., can be mentioned, methacrylic acid being preferred. These other vinyl monomers can be used either singly or as a combination of two or more of them.

The content of other vinyl monomer units (a-3) in the maleimide-based copolymer of the present invention is 0 to 35% by weight, preferably 0 to 25% by weight, or 10 to 35% by weight. When the content of other vinyl monomer units exceeds 35% by weight, the obtained maleimide-based copolymer is deteriorated in heat resistance, transparency, impact resistance and processability.

In the maleimide-based copolymer of the present invention, the content of residual maleimide monomers is not more than 0.1% by weight, preferably not more than 0.05% by weight, and the content of the whole volatiles other than the maleimide monomers is not more than 0.5% by weight, preferably not more than 0.4% by weight. When the content of the residual maleimide monomers exceeds 0.1% by weight, not only is said copolymer excessively tinted and deteriorated in transparency but there also tend to arise problems such as thermal tinting and bleed out during processing. Volatiles other than the maleimide monomers in said copolymer include the residues of the component monomers, organic solvent and optionally used polymerization initiator, chain transfer agent, etc. When the total amount of these residual volatiles exceeds 0.5% by weight, there arise problems such as deteriorated heat resistance of said copolymer, formation of silver streaks during processing, etc.

The maleimide-based copolymer of the present invention contains 2 to 10% by weight, preferably 3 to 9% by weight of a compound obtained from at least one monomer selected from the group consisting of a maleimide monomer, an aromatic vinyl monomer and other vinyl monomers, said compound having a weight-average molecular weight in a range of 200 to 1,000 as measured by gel permeation chromatography (GPC). The compound content can be determined from the GPC elution curve as a ratio of peak area within the corresponding region to the whole peak area. The monomeric components constituting said compound can be determined by elemental analysis after removing the solvent by drying the eluate of said compound components separated and collected by GPC. The structural units of said compound are the units of at least one monomer selected from the group consisting of a maleimide monomer, an aromatic vinyl monomer and other vinyl monomers, and preferably contain a maleimide monomer unit. Said compound needs to have a molecular weight of 200 or above. A compound having a molecular weight less than 200 is causative of silver streaks during molding, and a compound whose molecular weight exceeds 1,000 does not contribute to the improvement of fluidity and is unsuitable for the purpose of the present invention. When the content of said compound is less than 2% by weight, said copolymer is low in fluidity in the molten state and poor in molding processability, and when the content of said compound exceeds 10% by weight, said copolymer is lowered in heat resistance and mechanical strength, and there also tends to take place tinting of the copolymer when heated.

Yellow index (YI) of the maleimide-based copolymer of the present invention is 30 or below, preferably 25 or below. YI shown here is that of a plate molded from said copolymer. It has close relation with the residual amount of maleimide monomer in said copolymer and, when using vinyl cyanide monomer used as other vinyl monomer, the residual amount and the content of the vinyl cyanide monomer units taken in the polymer. YI is also influenced when an excess amount of compound is contained as mentioned above. In this case, when YI exceeds 30, thermal tinting is caused by heat treatment during processing to impair appearance of the molded product.

Intrinsic viscosity of the maleimide-based copolymer of the present invention falls in a range of 0.3 to 1.5 dl/g, preferably 0.5 to 1.2 dl/g. Intrinsic viscosity was determined by dissolving the maleimide-based copolymer in N,N-dimethylformamide and measuring viscosity of this solution by an Ubbelohde's viscometer at 25° C. A maleimide-based copolymer having an intrinsic viscosity below 0.3 dl/g is poor in practical mechanical strength and can not stand practical use, and a maleimide-based copolymer whose intrinsic viscosity exceeds 1.5 dl/g is bad in fluidity in the moltend state and poor in molding processability.

The maleimide-based copolymer of the present invention needs to meet all of the above-specified requirements for the amount of residual maleimide monomers, the amount of whole volatiles other than maleimide monomers, the amount of the compound obtained from at least one monomer selected from the group consisting of a maleimide monomer, an aromatic vinyl monomer and other vinyl monomers, said compound having a weight-average molecular weight of 200 to 1,000 as measured by GPC, and for YI and intrinsic viscosity.

As method for producing the maleimide-based copolymer (A) of the present invention, the generally known methods can be employed. In production of the copolymer of the present invention, it is possible to add a polymerization initiator, chain transfer agent, thermal stabilizer, etc., as desired. As polymerization initiator usable as desired in producing the copolymer of the present invention, the generally known organic peroxides and azo compounds can be mentioned. As the organic peroxide, there can be used ketone peroxides, peroxy ketals, hydroperoxides, dialkyl peroxides, diacyl peroxides, poroxyesters, peroxy dicarbonates and the like, such as methyl ethyl ketone peroxide, methyl isobutyl ketone peroxide, methylcyclohexanone peroxide, acetylacetone peroxide, 1,1-dibutylperoxy-3,3,5-trimethylcyclohexane, 1,1-dibutylperoxycyclohexane, 2,2-di-t-butylperoxybutane, 2,2,4-trimethylpentyl-2-hydroperoxide, dicumyl peroxide, 2,5-dimethyl-2,5-di-(t-butylperoxy)hexane, t-butylcumyl peroxide, di-t-butyl peroxide, tris-(t-butylperoxy)triazine, di-t-butyl peroxyhexahydroterephthalate, etc. As the azo compound, 1,1'-azobis(cyclohexane-1-carbonitrile), 2,2'-azobis(2-methylbutyronitrile), 2,2'-azobisisobutyronitrile, 2,2'-azibis[2-(2-imidazoline-2-yl)propane] dihydrochloride, azodi-t-octane-2-cyano-2-propylazoformamide, dimethyl-2,2'-azobis(2-methylpropionate), 2,2'-azobis(2-hydroxymethylpropionitrile) and the like can be mentioned. As the chain transfer agent usable as desired in producing the copolymer of the present invention, the known ones can be used, and as examples thereof, mercaptans, terpene oils, α-methylstyrene dimers and the like can be mentioned. As additives such as thermal stabilizer usable as desired in producing the copolymer of the present invention, the known ones can be used, but those which may impede polymerization or cause adverse effect such as tinting are undesirable.

Rubber-based graft polymer (B) in the present invention is obtainable by graft polymerizing a vinyl monomer in the presence of a rubber-like polymer.

As the rubber-like polymer, elastomers such as diene rubber, acrylic rubber, EPDM rubber, chlorinated polyethylene rubber, silicone rubber, silicone-acryl composite rubber and the like can be used. Diene rubber, especially butadiene rubber is preferred in view of impact resistance.

This butadiene rubber comprises 50 to 100% by weight of 1,3-butadiene and 50% by weight or less of a monomer having a vinylidene group ($CH_2$=C<) which is copolymerizable therewith (the total being 100% by weight), in other words, it is a single polymer of 1,3-butadiene or a copolymer comprising 50% or more of 1,3-butadiene units. As examples of said butadiene rubber, there can be mentioned polybutadiene rubber, butadiene-styrene copolymer rubber, butadiene-vinyltoluene copolymer rubber, butadiene-acrylonitrile copolymer rubber, butadiene-methacrylonitrile copolymer rubber, butadiene-methyl acrylate copolymer rubber, butadiene-2-ethylhexyl acrylate copolymer rubber, butadiene-methyl methacrylate copolymer rubber, butadiene-ethyl methacrylate copolymer rubber and the like. These butadiene rubbers also include terpolymer comprising 50% by weight or more of 1,3-butadiene units, and their glass transition temperature is 0° C. or below.

The vinyl monomer used in graft polymerization of rubber-based graft copolymer (B) is at least one of vinyl monomer selected from the group consisting of an aromatic vinyl monomer, an acrylic ester monomer and a derivative thereof, and vinyl cyanide monomers.

Aromatic vinyl monomers usable in the present invention are styrene, alkylstyrenes such as α-methylstyrene and t-butystyrene; halogenated styrenes such as chlorostyrene and bromostyrene;vinyltoluene, and the like, and these monomers may be used either singly or as a mixture of two or more of them. Preferably, styrene or α-methylstyrene is used singly or as a mixture of the two kinds.

Acrylic or methacrylic ester monomers and derivatives thereof usable in the present invention include methyl acrylate, methyl methacrylate, methyl ethacrynate, ethyl acrylate, ethyl methacrylate, ethyl ethacrynate, propyl acrylate, propylmethacrylate, butyl acrylate, butyl methacrylate, 2-ethylhexylacrylate, 2-ethylhexyl methacrylate, and derivatives thereof. These monomers and derivatives may be used either singly or as a mixture of two or more of them. Of these monomers, methyl acrylate, methyl methacrylate, ethyl acrylate, ethyl methacrylate, propyl acrylate, butyl acrylate and the like are preferred.

Vinyl cyanide monomers usable in the present invention are acrylonitrile, halogenated acrylonitrile, methacrylonitrile, ethacrylonitrile, fumaronitrile and derivatives thereof, and these monomers may be used either singly or as a mixture of two or more of them. Acrylonitrile and/or methacrylonitrile is preferred. In the present invention, other vinyl monomers, for example, maleimide and maleimide monomers such as N-methylmaleimide, N-phenylmaleimide, etc., and derivatives thereof, acrylamides and derivatives thereof, can be used as desired.

Thus, the present invention also relates to maleimide-based resin compositions comprising maleimide-based copolymers (A)such as mentioned above and rubber-based graft copolymers (B) produced by polymerizing at least one vinyl monomer selected from an aromatic vinyl monomer, an acrylic or methacrylic ester monomer and a derivative thereof, and a vinyl cyanide monomer in the presence of a rubber-like polymer. Here, the component (B) has the role of a rubber-reinforced resin for providing impact resistance to the resin composition.

As for the ratios of maleimide-based copolymer (A) and rubber-based graft copolymer (B) in the maleimide-based resin composition, (A) is 5–95% by weight, preferably 40–95% by weight, and (B) is 5–95% by weight, preferably 5–60% by weight, the total of (A) and (B) being 100% by weight.

As for the ratios of rubber-like polymer and vinyl monomer in rubber-based graft copolymer (B), the rubber-like polymer is 5–80% by weight, preferably 5–70% by weight, more preferably 35–70% by weight, even more preferably 40–65% by weight, and the vinyl monomer is 20–95% by weight, preferably 30–95% by weight, more preferably 30–65% by weight, even more preferably 35–60% by weight, the total of the rubber-like polymer and vinyl monomer being supposed to be 100% by weight. When the rubber-like monomer is less than 5% by weight, impact resistance is unsatisfactory, and when it exceeds 80% by weight, the resin lacks hardness.

Number-average particle diameter of the rubber-like polymer such as butadiene rubber used in the present invention is preferably in a range of 0.15 to 0.4 μm, more preferably 0.2 to 0.35 μm. When the number-average particle diameter of butadiene rubber is less than 0.15 μm, impact resistance of the maleimide-based resin composition is deteriorated, and when said particle diameter exceeds 0.4 μm, molding appearance and impact resistance are deteriorated.

Intrinsic viscosity of ungrafted polymer contained in the rubber-based graft copolymer (B) is preferably in a range of 0.4 to 1.2 dl/g, more preferably 0.5 to 0.9 dl/g. When intrinsic viscosity of said ungrafted polymer is less than 0.4 dl/g, impact resistance of the maleimide-based resin composition is deteriorated. On the other hand, when intrinsic viscosity of the ungrafted polymer exceeds 1.2 dl/g, the maleimide-based resin composition is low in fluidity and deteriorated in molding processability.

Graft ratio of rubber-based graft copolymer (B) is in a range of 20 to 80%, preferably 20 to 60%, more preferably 25 to 50%, even more preferably 30 to 45%. When the graft ratio of graft copolymer is less than 20%, cohesion of the graft copolymer tends to take place, impairing the molding appearance of the maleimide-based resin composition. When the graft ratio of graft copolymer exceeds 80%, impact resistance of the maleimide-based resin composition is deteriorated.

Preferably rubber-based graft copolymer (B) is the one ($B_1$) obtained by graft polymerizing acrylonitrile (b-2) and styrene (b-3) in the presence of butadiene rubber (b-1).

The content of butadiene rubber (b-1) in the rubber-based graft copolymer ($B_1$) needs to fall in a range of 35 to 70% by weight, preferably 40 to 65% by weight of the total (100% by weight) of (b-1) to (b-3). When the content of (b-1) is less than 35% by weight, it is necessary to blend a large amount of said rubber-reinforced resin in the resin composition for elevating face impact resistance of the maleimide-based resin composition, so that heat resistance of said composition is deteriorated. On the other hand, when the content of (b-1) exceeds 70% by weight, molding appearance of the maleimide-based resin composition is impaired.

Regarding the contents of acrylonitrile and styrene in rubber-reinforced resin ($B_1$), the content of acrylonitrile (b-2) needs to be in a range of 7.5 to 29.25% by weight and that of styrene (b-3) in a range of 16.5 to 48.75% by weight, and the ratio of (acrylonitrile (b-2)/(acrylonitrile (b-2)+styrene (b-3))) needs to be 0.25 to 0.45. When the ratio of (acrylonitrile (b-2)/(acrylonitrile (b-2)+styrene (b-3))) is less than 0.25 or exceeds 0.45, compatibility of the resin with the maleimide-based copolymer (A) is deteriorated and the obtained maleimide-based resin composition is lowered in face impact resistance.

Preferably rubber-based graft copolymer (B) is the one ($B_2$) prepared by two-stage graft polymerization in the manner described below. That is, it is preferably a graft polymer (B2) obtained by polymerizing 10 to 40% by weight of acryronitrile, 30 to 90% by weight of styrene and 45% by weight or less, preferably 35% by weight or less of α-methylstyrene, in the presence of 35 to 70% by weight of butadiene rubber, wherein:

(I) the number-average particle diameter of butadiene rubber in said graft polymer is in a range of 0.15 to 0.4 μm, (II) said graft polymer is the one obtained by polymerizing 40 to 60 parts by weight of a monomer mixture (d) in which the weight ratio given by (weight of acrylonitrile)÷((weight of acrylonitrile)+(weight of styrene)) is 0.1 to 0.4, and then polymerizing 40 to 60 parts by weight of a monomer mixture (e) in which the weight ratio given by (weight of acrylonitrile)÷((weight of acrylonitrile)+(weight of styrene or α-methylstyrene)) is 0.1 to 0.4 (the total of monomer mixture(d) and monomer mixture (e) being 100 parts by weight), (III) intrinsic viscosity of the ungrafted polymer contained in said graft polymer is 0.5 to 1.3 dl/g after polymerization of monomer mixture (d) and 0.3 to 1.0 dl/g after polymerization of monomer mixture (e), thus the intrinsic viscosity of said polymer being lower after polymerization of (e) than after polymerization of (d), and (IV) graft ratio of said graft polymer is 3 to 80% after polymerization of monomer mixture (d) and 20 to 70% after polymerization of monomer mixture (e).

When the weight ratio of monomer mixture (d) is less than 40 parts by weight and the weight ratio of monomer mixture (e) exceeds 60 parts by weight, the final resin composition is found poor in impact resistance, and when the weight ratio of monomer mixture (e) is less than 40 parts by weight and the weight ratio of monomer mixture (d) exceeds 60 parts by weight, the final resin composition proves to be poor in its molding appearance. It is also desirable that intrinsic viscosity of the ungrafted polymer after polymerization of monomer mixture (d) is 0.6 to 1.0 dl/g, and intrinsic viscosity of the ungrafted polymer after polymerization of monomer mixture (e) is 0.4 to 0.8 dl/g. When intrinsic viscosity of the ungrafted polymer is less than 0.5 after polymerization of monomer mixture (d) or less than 0.3 after polymerization of monomer mixture (e), impact resistance shown by the product of the present invention is unsatisfactory, and when intrinsic viscosity of the ungrafted polymer exceeds 1.3 after polymerization of monomer mixture (d) or exceeds 1.0 after polymerization of monomer mixture (e), molding processability is badly deteriorated.

When intrinsic viscosity is lower after polymerization of monomer mixture (d) than after polymerization of monomer mixture (e), impact resistance and molding processability of the final resin composition are poor.

For the preparation of rubber-based graft copolymer (B) of the present invention, there can be employed the generally known polymerization methods such as emulsion polymerization, bulk polymerization, suspension polymerization, solution polymerization, emulsion/suspension polymerization, emulsion/bulk polymerization, etc., but emulsion polymerization is preferred.

In the present invention, other hard thermoplastic resin (C) can be used beside said maleimide-based copolymer (A) and rubber-based graft copolymer (B) as optional component. This component (C) is the one used for improving molding processability, appearance and mechanical performance of the resin composition. As examples thereof, acrylonitrilestyrene copolymer (AS resin), α-methylstyrene-acrylonitrile copolymer (αSAN), polymethyl methacrylate (PMMA), methyl methacrylate-styrene copolymer (MS resin) and the like can be mentioned.

The resin composition of the present invention is the product obtained by blending said maleimide-based copolymer (A) and rubber-based graft copolymer (B) such that the amount of the former will be in a range of 5 to 95 parts by weight, preferably 40 to 95 parts by weight, and the amount of the latter will be in a range of 5 to 95 parts by weight, preferably 5 to 60 parts by weight, the total of (A) and (B) being 100 parts by weight. When the blending amount of rubber-based copolymer (B) is less than 5 parts by weight, impact resistance of the obtained resin composition is unsatisfactory, and when its amount exceeds 95 parts by weight, heat resistance of the obtained resin composition lowers. The amount of other hard thermoplastic resin (C) which can be blended as an optional component is 0 to 300 parts by weight to 100 parts by weight of the total of said components (A) and (B). When the amount of said component (C) exceeds 300 parts by weight, improvement of heat resistance and impact resistance of the finally obtained resin composition can not be expected.

In the resin composition of the present invention, it is possible to blend, either singly or in admixture, a hindered phenolic antioxidant or phosphite type stabilizer for the purpose of improving heat stability, a benzophenone type ultraviolet absorber, a hindered amine type stabilizer or a benzotriazole type ultraviolet absorber for the purpose of improving weather resistance, and an amide type lubricant such as ethylene bis-stearylamide or an amide type metal soap for the purpose of improving processability. It is also possible to blend a flame-retarding agent to obtain a flame-retardant resin composition.

The resin composition of the present invention can be utilized in the field of various types of molding processes such as injection molding, extrus in molding, vacuum molding, etc., and the molded product thereof may be subjected to a sheen imparting treatment such as plating, vacuum deposition, sputtering, etc.

In the maleimide-based resin composition using a rubber-based graft copolymer ($B_2$) prepared by said two-stage graft polymerization, it is desirable that:

component (A) is 5 to 95% by weight and component (B) is 5 to 95% by weight;

other thermoplastic resin (C) is 75% by weight or less, and weight fraction of the rubber-like component given by ((B)×(weight ratio of butadiene rubber))/((A)+(B)+(C)) is 3 to 30% by weight.

Rubber-based graft copolymer (B) is preferably the one ($B_3$) composed of 40 to 70% by weight of a rubber moiety comprising one composite rubber consisting of a diene type rubber-like copolymer and an acrylic ester type rubber or comprising said composite rubber and an acrylic ester type rubber-like copolymer, and 60 to 30% by weight of a graft moiety comprising 15 to 45% by weight of vinyl cyanide monomer units and 85 to 55% by weight of aromatic vinyl monomer units.

"Diene type rubber-like polymer" used here is a copolymer consisting of 70% by weight or more of a diene and 30% by weight or less of other monomer copolymerizable therewith. As the diene, there can be mentioned 1,3-butadiene, isoprene and chloroprene. As that other copolymerizable monomer, vinyl cyanide monomers such as acrylonitrile and aromatic vinyl monomers such as styrene can be mentioned. Preferred examples of diene type rubber-like copolymer are polybutadiene rubber, acrylonitrile-butadiene copolymer rubber, styrene-butadiene copolymer rubber and the like, of which polybutadiene rubber is most preferred. These copolymers are the ones obtained from the known emulsion polymerization method.

The particles in the latex of diene type rubber are preferably large-sized particles, with the number-average particle diameter being 0.2 to 1.0 $\mu$m, in view of impact resistance of the resin composition. Such rubber with large-sized particles may be the one obtained slowly over a long time through several stages of seed polymerization, but it is desirable to use a rubber latex obtained efficiently by a particle enlarging operation, that is, the one obtained by enlarging the latex particles to a desired size by adding an acidic group-containing polymer latex to the base rubber latex with a particle size of 0.03 to 0.15 $\mu$m.

Acidic group-containing copolymer latex can be obtained by emulsion polymerizing 3 to 40% by weight of at least one unsaturated acid selected from the group consisting of acrylic acid, methacrylic acid, itaconic acid, crotonic acid, cinnamic acid, sorbic acid and p-styrenesulfonic acid, and 97 to 60% by weight of at least one of acrylic esters in which the carbon number of the alkyl group is 1 to 12. Of these copolymers, that of methylacrylic acid with butyl acrylate can be mentioned as a preferred example.

The amount of the acidic group-containing copolymer latex added for the particle enlarging operation is 0.5 to 8 parts by weight, as solids, based on 100 parts by weight (as solids) of the base diene type rubber-like latex. For enlarging the particle size to the order of 0.2 to 1.0 $\mu$m, it is necessary to make pH of the base rubber latex 9 or above and to use an unsaturated acid-containing copolymer latex with a high acidic group content. In the particle enlarging operation, it rarely occurs that the whole of the base rubber be made into particle-enlarged rubber, and usually there remains a portion of base rubber which kept aloof from the enlarging treatment. Therefore, the particle-enlarged rubber has a two-dispersion particle size distribution. However, even if a small quantity of unenlarged particles remain, there can be obtained a resin composition of a quality level substantially free of problems in terms of physical properties.

From the aspect of weather resistance, the rubber component is preferably the one comprising one composite rubber consisting of a diene rubber and an acrylic rubber, or a rubber polymer comprising said composite rubber and an acrylic rubber.

"Composite rubber" is the one obtained by seed polymerizing 60 to 95% by weight of a monomer mixture consisting of an acrylic ester, a crosslinking agent and a graft linking agent in the presence of 5 to 40% by weight (as solids) of a diene type rubber latex.

The acrylic ester used here is an acrylic alkyl ester in which the carbon number of alkyl group is 1 to 12, or an acrylic aromatic ester having a benzene ring such as phenyl group or benzyl group. Preferred examples of such acrylic esters are n-butyl acrylate, 2-ethylhexyl acrylate, ethyl acrylate and the like, and these esters may be used either singly or in admixture. An acrylic ester compound having a functional group, such as glycidyl acrylate, 2-hydroxyethyl acrylate, tetrahydrofurfuryl acrylate, dimethylaminoethyl acrylate and the like, may be used jointly with said esters provided that the amount of said compound is not more than 30% by weight.

As the crosslinking agent, there can be mentioned divinylbenzene, ethylene glycol diacrylate, ethylene glycol dimethacrylate, butylene glycol diacrylate, butylene glycol dimethacrylate, polyethylene glycol diacrylate, polyethyleneglycol dimethacrylate, triallyl cyanurate, triallyl isocyanurate, trimethylolpropane triacrylate and the like. As the graft linking agent, allyl acrylate, allyl methacrylate, allyl itaconate and the like can be mentioned. The amount and type of the crosslinking agent and the graft linking agent are decided so that the gel content of the rubber moiety and the ratio of the graft moiety to the rubber moiety will fall in the optimal ranges.

When a monomer mixture comprising an acrylic ester, etc., is seed polymerized in the presence of a diene type rubber latex, in case the monomer mixture is entirely seed polymerized into a diene type rubber, there is obtained only a composite rubber consisting of a diene type rubber and an acrylic rubber, but in some cases, the monomer mixture is not entirely seed polymerized into a diene type rubber and there is partly formed an independent acrylic rubber-like latex. In the latter case, there exist two types of rubber component, that is, acrylic rubber and composite rubber consisting of diene type rubber and acrylic rubber.

The ratios of the diene type rubber and the acrylic rubber (total of the seeded portion and the independently existing portion) in the composite rubber are 5 to 40% by weight of diene type rubber and 95 to 60% by weight of acrylic rubber. When the ratio of diene type rubber is less than 5% by weight, there is a tendency that the obtained resin composition lowers in impact resistance, while when said ratio exceeds 40% by weight, weather resistance of the resin composition tends to lower.

Seed polymerization is carried out by emulsion polymerization, and there can be employed several methods, such as a method in which the monomer mixture is added dropwise to the polymerization system while conducting polymerization continuously; a method in which the monomer mixture is previously immersed in a conjugated diene type rubber-like copolymer and then polymerization is carried out by adding a polymerization initiator; and a method in which the operation of immersing the monomer mixture and then carrying out polymerization is performed a desired number of times repeatedly while changing the composition of the monomer mixture at each stage. In carrying out seed polymerization, an emulsifier may be further added for the purpose of improving stability of the polymerization system.

The gel content (toluene insolubles) in the rubber moiety obtained by seed polymerization should be 85% by weight or more, preferably 90% by weight or more, so as not to impair the surface appearance of the obtained resin composition. Such a defined range of gel content can be obtained by optimizing the type and amount of the crosslinking agent used with an acrylic ester in seed polymerization, or by adjusting polymerization temperature, amount of initiator used or polymerization time (dropping time in case the monomer mixture is added dropwise).

The thus obtained rubber latex is successively subjected to graft polymerization. Graft polymerization is carried out by polymerizing 60 to 30% by weight of a monomer mixture consisting of a vinyl cyanide monomer and an aromatic vinyl monomer in the presence of 40 to 70% by weight (as solids) of the rubber latex. When the rubber moiety is less than 40% by weight, the amount of graft copolymer necessary for providing impact resistance to the resin composition increases, forcing a corresponding decrease of the amount of maleimide-based copolymer to reduce heat resistance of the composition. When the rubber moiety exceeds 70% by weight, coarse particles are produced in the solidification step conducted after graft polymerization, making it unable to recover the particles.

As the vinyl cyanide monomer used for the graft polymerization, acrylonitrile, methacrylonitrile, ethacrylonitrile, maleonitrile, fumaronitrile and the like can be mentioned, of which acrylonitrile can be mentioned as a preferred example. As the aromatic vinyl monomer, styrene, α-methylstyrene, o-methylstyrene, p-methylstyrene, 2,4-dimethylstyrene, p-t-butylstyrene, halogenated styrene and the like can be mentioned, of which styrene and α-methylstyrene can be mentioned as preferred examples. The ratios of a vinyl cyanide monomer and an aromatic vinyl monomer used are 15 to 45% by weight of an unsaturated cyanogen compound and 85 to 55% by weight of an aromatic vinyl compound in view of impact resistance, molding processability and thermal tinting characteristics of the resin composition.

For graft polymerization, the known emulsion polymerization methods can be employed. For example, a method in which the monomer mixture is supplied en block and then polymerized, a method in which a part of monomer mixture is first fed and the rest is then supplied dropwise, a method in which polymerization is conducted continuously while adding the whole amount of monomer mixture dropwise, or other method is carried out in one stage or in two or more stages, with the type and composition of the monomer mixture being properly changed for each stage. In graft polymerization, it often occurs that the whole of monomer mixture is not grafted to the rubber moiety as graft moiety, with a part of the mixture remaining in a free state. Such a copolymer exists as copolymer (C) in the resin composition. The thus obtained graft copolymer ($B_3$) latex is solidified in a known way and passed through the steps of dehydration, washing and drying to provide a graft copolymer ($B_3$).

In case said rubber-based graft copolymer ($B_3$) is used with maleimide-based copolymer (A), copolymer (C) may be additionally used to compose a desired maleimide-based copolymer resin composition.

Copolymer (C) used in the present invention can be obtained by copolymerizing a monomer mixture consisting of 15 to 45% by weight of an unsaturated cyanogen compound and 85 to 55% by weight of an aromatic vinyl compound. As for the vinyl cyanide monomer and aromatic vinyl monomer, the compounds of the type and the amount used for the preparation of graft copolymer (B) described above are preferably used.

Copolymer (C) may be the one which was formed as a by-product in graft polymerization as mentioned in the explanation of graft copolymer ($B_3$), but a separately produced one may be used depending on the purpose of use. As for the purpose of use of copolymer (C), for instance a copolymer with a low molecular weight is used for further bettering molding workability of the resin composition, and a copolymer with a very high molecular weight is used for enhancing melt strength of the composition when it is melted by heating. Copolymer (C) is used as desired in an amount of 0 to 40% by weight.

Production of copolymer (C) is carried out by a known polymerization method, but the one produced from solution polymerization or suspension polymerization is preferred.

The maleimide-based copolymer resin composition of the present invention can be obtained by blending 40 to 85 parts by weight of maleimide-based copolymer (A), 15 to 50 parts by weight of graft copolymer ($B_3$) and, if necessary, 0 to 40 parts by weight of copolymer (C) (the total of (A), ($B_3$) and (C) being 100 parts by weight). When the blending ratio of graft copolymer ($B_3$) is less than 15 parts by weight, impact resistance of the resin composition tends to lower, while when the ratio of ($B_3$) exceeds 50 parts by weight, heat resistance of the resin composition tends to lower. Also, when the blending ratio of maleimide-based copolymer (A) is less than 40 parts by weight, heat resistance of the resin composition lowers, and when the ratio of (A) exceeds 85 parts by weight, impact resistance of the resin composition lowers. Further, when the blending ratio of copolymer (C) exceeds 40 parts by weight, since the ratio of graft copolymer ($B_3$) or maleimide-based copolymer (A) decreases relatively, impact resistance or heat resistance of the resin composition is impaired.

In blending of graft copolymer ($B_3$), maleimide-based copolymer (A) and copolymer (C), it is possible to add as desired an antioxidant, various types of stabilizer such as light stabilizer, lubricant, plasticizer, releasing agent, dye, pigment, antistatic agent, inorganic filler, etc. A mixture of these materials is melted and kneaded by using a screw extruder, mixing rolls or other means and then pelletized.

The present invention is described in more detail below with reference to the examples and comparative examples, but the present invention is in no way limited by these examples.

In the following description, all "parts" and "%" are by weight unless otherwise noted. Various measurements were made according to the following methods.

(1) The amount of the residual monomers in the copolymer was measured by gas chromatography.

(2) Compositional ratios of the respective monomer units in the copolymer were determined by elemental analysis.

(3) Yellow index (YI) was measured according to ASTM D-1925 by molding the copolymer into a 3 mm thick plate specimen by a one-ounce injection molding machine at a cylinder temperature of 260° C.

(4) Vicat softening temperature was measured according to ASTM D-1525 (load: 5 kg) by molding a test specimen in the same way as described in (3) above. However, in Examples 5–7 and Comparative Examples 8–11, Vicat softening temperature was measured with a 1-ounce injection molding machine according to ASTM D-1525 (load: 5 kg) using a test specimen molded with a 2-ounce injection molding machine at a cylinder temperature of 240° C. In Examples 21–23 and Comparative Example 20, Vicat softening temperature was measured according to ISO R-306 (unit: ° C.).

(5) Intrinsic viscosity [η] of the copolymer was measured by dissolving the copolymer in N,N-dimethylformamide and measuring the viscosity of the solution by an Ubbellohde viscometer at 25° C.

(6) Fluidity 6-1 As an index of molding processability, short shot pressure and spiral flow distance during molding of the specimen were measured and compared.

"Short shot pressure" means the minimal injection pressure necessary for filling a required amount of resin in the die. It is variable depending on molding temperature, die, molding machine, melt viscosity of the resin, etc., but in case molding is carried out under the fixed conditions, it can be said that the lower the short shot pressure is, the higher is molding processability of the resin.

"Spiral flow distance" is an index for comparison of fluidity of resin, determined by measuring the length of the molded product obtained from molding conducted under a fixed injection pressure using a 1 cm wide and 2 mm thick die with its end open to the outside. A greater value of spiral flow distance indicates a better molding processability of resin. In the present Examples and Comparative Examples, there were shown the lengths of the molded products obtained from molding by a one-ounce injection molding machine at a cylinder temperature of 260° C. under an injection pressure of 450 kg/cm². However, in Examples 4, 8 and 9 and Comparative Examples 6, 7 and 12–15, the lengths of the molded products obtained from molding by a 2-ounce molding machine at a cylinder temperature of 260° C. under an injection pressure of 1,000 kg/cmz using a 15 mm wide and 2 mm thick die with its end open to the outside were measured.

6-2 Melt index (MI)

Measured according to JIS K7210 (220° C.; load: 10 kg, g/10 min). However, in Examples 5–7 and Comparative Examples 8–11, the discharge rate in the 10-minute period under the conditions of 220° C. and 10 kg loading was measured according to ASTM D-1238.

(7) Gel content (%) of rubber moiety 0.25 g of dried rubber-like polymer specimen was immersed in 100 cc of toluene of 95° C. for 6 hours and then filtered by a 100-mesh wire gauge. Then the insolubles left on the wire gauge were dried in vacuo, the weight thereof was measured, and the obtained value was divided by the weight of the specimen.

(8) Average particle diameter of conjugated diene type rubber-like latex

A diluted solution of polymer latex was exposed to vapors of ruthenium tetroxide and fixed, the fixed specimen was photographed by a transmission electron microscope, and the average particle diameter was determined from the obtained micrograph.

(9) Izod impact strength (Iz)

Determined according to ASTM D-256 (¼ inch; unit: kg·cm/cm).

(10) Gloss

Determined according to ASTM D-523 (angle of incidence: 600). A 100 mm×100 mm×3 mm (thickness) flat plate molded at 270° C. was used as test piece.

(11) Weather resistance

Using Sanshine Super Long Life Weather Meter WEL-SUN-DCH mfd. by Suga Testing Machine Co., Ltd., the test piece was exposed to light under the conditions of black panel temperature of 63° C. and intermittent raining (12 minutes of raining at a cycle of 60 minutes) for 500 hours. Surface gloss after this period of exposure was measured by the method of (10) above and evaluated in terms of retention (%) of gloss in comparison with surface gloss before exposure.

(12) Graft ratio of rubber-based graft copolymer (B)

Using specimen prepared by solidifying latex polymer with isopropyl alcohol, ungrafted polymers were removed from the polymer by acetone extraction, the graft polymer content of the specimen was measured, and the graft ratio was determined from the formula of: (graft polymer content−rubber content)/rubber content ×100.

(13) Compound content of maleimide-based copolymer (A) and molecular weight

Measured by GPC with monodisperse polystyrene as standard.

Weight-average molecular weight (Mw) of the maleimide-based copolymer, its number-average molecular weight (Mn) and Mw/Mn ratio were calculated from the GPC elution curve using standard polymer of polystyrene as reference.

(14) Number-average particle diameter of diene type rubber of rubber-reinforced resin (B)

Determined from a transmission electron micrograph.

(15) Intrinsic viscosity of ungrafted polymer of rubber-reinforced resin (B)

Latex polymer was solidified with isopropyl alcohol, the obtained polymer was extracted with acetone, centrifuged and filtered, and acetone in the filtrate was evaporated away. The resulting polymer was dissolved in N,N-dimethylformamide and the viscosity of the solution was measured by Ubbellohde viscometer at 25° C.

(16) Face impact resistance of maleimide-based resin composition

The resin composition was molded into a 100 mm×100 mm×3 mm (thickness) test piece at 260° C. using a 2-ounce injection molding machine, and face impact resistance of this test piece was measured by a Shimadzu High-Speed Impact Tester HTM-1 according to ASTM D-3763, at 23° C. and a speed of 3.3 m/sec. However, a ½-inch striker and a 3-inch support frame were used.

(17) Heat decomposability

Maleimide-based copolymer (A) and rubber-reinforced resin (B) were mixed well and the mixture was pelletized by a 30 mmφ double-screw extruder at a cylinder temperature of 250° C. The obtained resin was injection molded at cylinder temperature of 240° C. to form test pieces, and their heat decomposability was determined in the following way.

The test pieces were molded into 50×80×3 mm plates at 300° C. using a one-ounce injection molding machine and heat decomposability was judged from the number of silver streaks formed on the plate surface, according to the following criterion:

o: No silver streak.

Δ: Silver streaks were formed on about 5 out of 10 test plates in a sample group.

EXAMPLE 1

To a 20-litre polymerization reactor equipped with a stirrer and having its atmosphere replaced with nitrogen, 20 parts of N-phenylmaleimide, 40 parts of styrene, 20 parts of acrylonitrile, 20 parts of methyl ethyl ketone, 0.01 part of 1,1'-azobis(cyclohexane-1-carbonitrile) and 0.05 part of t-dodecylmercaptan were supplied continuously using a pump. With the temperature in the polymerization reactor kept constant at 110° C., the polymerization reaction solution was continuously discharged by a gear pump provided at the reactor bottom so that the average residence time would become 2 hours. Then the polymerization reaction solution was allowed to stay in a 150° C. heat exchanger for about 20 minutes and then introduced into a two-vent type 30 mm double-screw extruder controlled at a barrel temperature of 230° C., with the first vent portion being kept under atmospheric pressure and the second vent portion under a vacuum of 20 Torr, thereby evaporating away the volatiles, and the extrudate was pelletized to obtain pellets of maleimide-based copolymer. Various properties of this maleimide-based copolymer were determined, the results being shown in Table 1.

Comparative Example 1

Using the same equipment as in Example 1, the same operation as in Example 1 was carried out except that the temperature of the polymerization reactor was set at 95° C., that the amount of 1,1'-azobis(cyclohexane-1-carbonitrile) was 0.18 part, and that the amount of t-dodecylmercaptan was 0.22 part to obtain pellets of maleimide-based copolymer. Molding and property determinations of these pellets were conducted in the same way as in Example 1. The results are shown in Table 1.

Comparative Example 2

Using the same equipment as in Example 1 and Comparative Example 1, the same operation as in Example 1 was carried out except that the temperature of the polymerization reactor was set at 1500° C., that the amount of 1,1'-azobis (cyclohexane-1-carbonitrile) was 0.001 part, and that the amount of t-dodecylmercaptan was 0.005 part to obtain pellets of maleimide-based copolymer. Molding and property determinations of these pellets were conducted in the same way as in Example 1. The results are shown in Table 1.

EXAMPLE 2

Using the same equipment as in Example 1, there was carried out the same operation as in Example 1 except that 30 parts of N-phenylmaleimide, 30 parts of styrene, 40 parts of methyl ethyl ketone, 0.01 part of azobisisobutylonitrile and 0.4 part of n-octylmercaptan were supplied, that the temperature in the polymerization reactor was 120° C. with the average residence time being 90 minutes, that no second reactor was used, and that the barrel temperature of the double-screw extruder was 270° C. to obtain pellets of maleimide-based copolymer. Molding and property determinations of these pellets were conducted in the same way as in Example 1. The results are shown in Table 1.

Comparative Example 3

Using the same equipment as in Example 2, there was carried out the same operation as in Example 2 except that 0.005 part of azobisisobutylonitrile and 0.3 part of n-octylmercaptan were supplied, and that the temperature in the polymerization reactor was set at 130° C. to obtain pellets of maleimide-based copolymer. Molding and property determinations of these pellets were conducted in the same way as in Example 1. The results are shown in Table 1.

Comparative Example 4

Using the same equipment as in Example 2, there was carried out the same operation as in Example 2 except 0.4 part of azobisisobutylonitrile and 1 part of n-octylmercaptan were supplied, and that the temperature in the polymerization reactor was set at 100° C. to obtain pellets of maleimide-based copolymer. Molding and property determinations of these pellets were conducted in the same way as in Example 1. The results are shown in Table 1.

EXAMPLE 3

Using the same equipment as in Example 1, there was carried out the same operation as in Example 1 except that 25 parts of N-phenylmaleimide, 40 parts of styrene, 15 parts of acrylonitrile, 20 parts of ethyl ethyl ketone, 0.015 part of 1,1'-azobis(cyclohexane- 1-carbonitrile) and 0.03 part of t-dodecylmercaptan were supplied, that the temperature in the polymerization reactor was set at 130° C., and that the barrel temperature of the double-screw extruder was 250° C. to obtain pellets of maleimide-based copolymer. Molding and property determinations of these pellets were conducted in the same way as in Example 1. The results are shown in Table 1.

Comparative Example 5

Using the same equipment as in Example 1, there was carried out the same operation as in Example 3 except that 0.1 part of 1,1'-azobis(cyclohexane-1-carbonitrile) and 0.2 part of t-dodecylmercaptan were supplied, and that the temperature in the polymerization reactor was set at 100° C. to obtain pellets of maleimide-based copolymer. Molding and property determinations of these pellets were conducted in the same way as in Example 1. The results are shown in Table 1.

One part of ethylene-bis-stearylamide (KAO WAX EBP produced by Kao Corp.) was added to 100 parts of said pellets and the mixture was extruded from a 30 mm double-screw extruder at a barrel temperature of 250° C. to obtain pellets. Determinations of these pellets conducted in the same way as in Example 1 showed that YI was 45, Vicat softening temperature was 146° C., short shot pressure was 33 kg/cm²G and spiral flow distance was 16 cm.

From the Examples and Comparative Examples, it is seen that the maleimide-based copolymer of the present invention has high heat resistance and excellent molding processability. It is also noted that when the content of the component compound having a molecular weight of 200 to 1,000 is below the range specified in the present invention, the produced copolymer is poor in fluidity, while when the content of the compound with a molecular weight of 200 to 1,000 containing a maleimide type monomer as a constituent is above the specified range of the present invention, although fluidity is high, heat resistance is impaired and also tinting tends to take place when heated. It is further seen that the maleimide-based copolymer of the present invention is improved in fluidity without inviting reduction of heat resistance which is caused when an ordinarily used lubricant, etc., are added.

TABLE 1

| | Copolymer composition (PhMI + St + AN = 100) | | | Residual | Volatiles other than |
|---|---|---|---|---|---|
| | PhMI (%) | St (%) | AN (%) | PhMI (%) | PhMI (%) |
| Example 1 | 25 | 50 | 25 | 0.05 | 0.25 |
| Comp. Example 1 | 25 | 50 | 25 | 0.05 | 0.30 |
| Comp. Example 2 | 25 | 50 | 25 | 0.05 | 0.25 |
| Example 2 | 62 | 38 | — | 0.05 | 0.4 |
| Comp. Example 3 | 62 | 38 | — | 0.05 | 0.4 |
| Comp. Example 4 | 62 | 38 | — | 0.05 | 0.4 |
| Example 3 | 35 | 50 | 15 | 0.05 | 0.35 |
| Comp. Example 5 | 35 | 50 | 15 | 0.05 | 0.4 |

| Compound components in co-polymer (Mw 200–1,000) | | | | Intrinsic | | Vicat | Spiral flow |
|---|---|---|---|---|---|---|---|
| Content (%) | PhMI (%) | St (%) | AN (%) | viscosity (dl/g) | YI | softening temperature | distance (cm) |
| 6 | 70 | 24 | 6 | 0.68 | 25 | 137 | 28 |
| 0.5 or less | —*1) | —*1) | —*1) | 0.65 | 21 | 138 | 12 |
| 13 | 70 | 24 | 6 | 0.56 | 36 | 134 | 36 |
| 9 | 45 | 55 | — | 0.46 | 26 | 184 | 11 |
| 14 | 45 | 55 | — | 0.44 | 36 | 178 | 14 |
| 1 | 45 | 55 | — | 0.50 | 25 | 192 | 6 |
| 7 | 60 | 30 | 10 | 0.76 | 22 | 151 | 22 |
| 1 | 62 | 32 | 8 | 0.78 | 19 | 153 | 12 |

Notes)
PhMi: N-phenylmaleimide; St: styrene; AN: acrylonitrile
*1)Unmeasureable.

Referential Example 1
Production of Rubber-based Graft Copolymer (B)
B-1:

The materials of the following composition were fed to a 5-litre glass-made polymerization reactor equipped with a stirrer:

| Polybutadiene latex (as solids) | 60 parts |
|---|---|
| Pure water | 140 parts |
| Dextrose | 0.6 parts |
| Sodium pyrophosphate | 0.3 parts |
| Ferrous sulfate | 0.002 parts |
| Potassium rhodinate | 1 part |

Then the contents of the polymerization reactor were heated to 60° C., and a mixed solution of 12 parts of acrylonitrile, 28 parts of styrene, 0.2 part of cumene hydroperoxide and 0.5 part of t-dodecylmercaptan was added continuously over a period of 2 hours, followed by 2-hour aging at 60° C. to complete the polymerization. The resulting polybutadiene-reinforced resin latex was solidified with sulfuric acid, then dehydrated and dried to obtain powder of polybutadien-reinforced resin B-1. The number-average particle diameter of the polybutadiene rubber used was 0.3 μm. Intrinsic viscosity of the ungrafted polymer of the obtained rubber-reinforced resin B-1 was 0.69 dl/g and its graft ratio was 39.

B-2 and B-3:

A mixed solution (A) of the formulation shown in Table 2 was supplied to a 5-litre glass-made polymerization reactor equipped with a stirrer. Then the contents of the polymerization reactor were heated to 60° C., followed by addition of cumene hydroperoxide in an amount shown in Table 2 to carry out polymerization until generation of heat in the polymerization reactor ceased. After polymerization, the reaction mixture was cooled to 60° C. and a mixed solution (B) of the formulation shown in Table 2 was supplied continuously. After the end of this supply, when generation of heat in the polymerization reactor ceased, 0.03 part of cumene hydroperoxide was added to carry out further polymerization at 60° C. for 0.5 hour to complete polymerization. The polybutadiene-reinforced resin latexes thus obtained were solidified with sulfuric acid, then dehydrated and dried to obtain powders of rubber-based graft copolymers B-2 and B-3. The number-average particle diameter of the butadiene rubber used was 0.3 μm in both cases.

TABLE 2

| | B-2 | B-3 |
|---|---|---|
| Mixed solution (A) (parts) | | |
| Polybutadiene latex (solids) | 45 | 45 |
| Acrylonitrile | 8.8 | 9.7 |
| Styrene | 18.7 | 17.9 |
| t-Dodecylmercaptan | 0.14 | 0.14 |
| Pure water | 140 | 140 |
| Dextrose | 0.35 | 0.35 |
| Sodium pyrophosphate | 0.2 | 0.2 |
| Ferrouos sulfate | 0.006 | 0.006 |
| Potassium rhodinate | 0.8 | 0.8 |
| Polymerization initiator | | |

TABLE 2-continued

|  | B-2 | B-3 |
|---|---|---|
| (parts) | | |
| Cumene hydroperoxide | 0.06 | 0.06 |
| Mixed solution (B) (parts) | | |
| Acrylonitrile | 8.8 | 9.55 |
| Styrene | 18.7 | 17.85 |
| t-Dodecylmercaptan | 0.38 | 0.38 |
| Cumene hydroperoxide | 0.04 | 0.04 |

EXAMPLES 4–6 AND COMPARATIVE EXAMPLES 6–9

Maleimide-based copolymers A-1 to A-3 obtained in Examples 1–3 and rubber-based graft copolymers B-1 to B-3 were blended in the ratios shown in Table 3 or Table 4, and a phenolic antioxidant (ANTAGE W-400, trade name, produced by Kawaguchi Chemical Co., Ltd.) and a phosphite type stabilizer (ADECASTAB C, trade name, produced by Asahi Electro-Chemical Co., Ltd.) were added as stabilizer, each in an amount of 0.2 part to 100 parts of the above blends. After mixed well, the mixtures were pelletized by a 30 mmφ double-screw extruder at 250° C. to obtain pellets of maleimide-based resin compositions. The results of performance evaluation of the obtained resin compositions are shown in Table 3.

TABLE 3

| | Resin blend composition (parts) | | | | | | Evaluation results | | |
|---|---|---|---|---|---|---|---|---|---|
| | Maleimide-based copolymer (A) | | Rubber-based graft copolymer (B) | | Hard thermoplastic resin (C) | Additive (lubricant) | Izod impact strength (kg · cm/cm) | Vicat softening temperature (° C.) | Spiral flow distance (mm) |
| Example 4 | A-1 | 70 | B-1 | 30 | — | — | 23 | 122 | 390 |
| Comp. Example 6 | A-2 | 70 | B-1 | 30 | — | — | 24 | 123 | 350 |
| Comp. Example 7 | A-3 | 70 | B-1 | 30 | — | — | 21 | 118 | 420 |
| Example 8 | A-4 | 54 | B-1 | 46 | AS 54 | — | 11 | 143 | 290 |
| Comp. Example 12 | A-5 | 54 | B-1 | 46 | AS 54 | — | 7 | 138 | 305 |
| Comp. Example 13 | A-6 | 54 | B-1 | 46 | AS 54 | — | 13 | 144 | 265 |
| Example 9 | A-7 | 70 | B-1 | 30 | — | — | 18 | 133 | 360 |
| Comp. Example 14 | A-8 | 70 | B-1 | 30 | — | — | 19 | 133 | 310 |
| Comp. Example 15 | A-2 | 70 | B-1 | 30 | — | EBS 1 | 20 | 117 | 380 |

Abbreviations in the table AS: AS resin, EBS: Ethylene-bis-stearylamide (KAO WAX EBP produced by Kao Corp.)

TABLE 4

| | Maleimide-based copolymer (A) | | Rubber-reinforced resin (B) | | Vicat softening temperature (° C.) | Face impact strength (kgf · mm) | Melt index (g/10 min) |
|---|---|---|---|---|---|---|---|
| | Type | Amount (parts) | Type | Amount (parts) | | | |
| Example 5 | A-1 | 60 | B-2 | 40 | 120 | 4700 | 2.4 |
| Comp. Example 8 | A-2 | 60 | B-2 | 40 | 122 | 4600 | 0.9 |
| Comp. Example 9 | A-3 | 60 | B-2 | 40 | 112 | 3000 | 5.7 |
| Example 6 | A-1 | 60 | B-3 | 40 | 120 | 4300 | 2.2 |

EXAMPLE 7 AND COMPARATIVE EXAMPLES 10–11

Maleimide-based copolymers A-1 to A-3, rubber-based graft copolymer B-1 and an AS resin having an intrinsic viscosity of 0.60 dl/g composed of 30% of acrylonitrile units and 70% of styrene units and produced by suspension polymerization, were blended in the ratios shown in Table 5, and a phenolic antioxidant (ANTAGE W-400, trade name, produced by Kawaguchi Chemical Co., Ltd.) and a phosphite type stabilizer (ADECASTAB C, trade name, produced by Asahi Electro-Chemical Co., Ltd.) were added as stabilizer, each in amount of 0.2 part to 100 parts of said blends. After mixed well, the mixtures were pelletized by a 30 mm$\phi$ double-screw extruder at 250° C. to obtain pellets of maleimide-based resin compositions. The results of performance evaluation of the obtained resin compositions are shown in Table 5.

TABLE 5

|  | Maleimide-based copolymer (A) | | Rubber-reinforced resin (B) | | Hard termoplastic resin (C) | | Vicat softening temperature (° C.) | Face impact strength (kgf · mm) | Melt index (g/10 min) |
| --- | --- | --- | --- | --- | --- | --- | --- | --- | --- |
|  | Type | Amount (parts) | Type | Amount (parts) | Type | Amount (parts) | | | |
| Example 7 | A-1 | 60 | B-1 | 40 | AS | 25 | 112 | 4200 | 3.2 |
| Comp. Example 10 | A-2 | 60 | B-1 | 40 | AS | 25 | 114 | 4000 | 1.5 |
| Comp. Example 11 | A-3 | 60 | B-1 | 40 | AS | 25 | 104 | 2400 | 6.5 |

Abbreviation in the table
AA: AS resin

EXAMPLES 8 AND COMPARATIVE EXAMPLES 12–13

Maleimide-based copolymers A-4 to A-6 obtained in Example 2 and Comparative Examples 3–4, rubber-based graft copolymer B-1 obtained in Referential Example B-1 and a AS resin composed of 30% by weight of acrylonitrile units and 70% by weight of styrene units and produced by suspension polymerization in the usual way were blended in the ratios shown in Table 2. To 100 parts of the obtained blends, there were added the same stabilizers in the same amount as used in Example 4, and the mixtures were treated in the same way as in Example 4 except that the extruder temperature was set at 280° C. to obtain pellets of maleimide-based resin compositions. The results of performance evaluation of the obtained resin compositions are shown in Table 3.

EXAMPLE 9 AND COMPARATIVE EXAMPLE 14

Maleimide-based copolymers A-7 and A-8 obtained in Example 3 and Comparative Example 5 and rubber-based graft copolymer B-1 obtained in Referential Example B-1 were blended in the ratios shown in Table 2. To 100 parts of the thus obtained blends, there were added the same stabilizers in the same amount as used in Example 4, and the mixtures were treated in the same way as in Example 4 except that the extruder temperature was set at 260° C. to obtain pellets of maleimide-based resin compositions. The results of performance evaluation of the obtained resin compositions are shown in Table 3.

Comparative Example 15

To a resin composed of 70 parts of maleimide-based copolymer A-2 and 30 parts of rubber-reinforced resin B-1, there were added 1 part of ethylene-bis-stearylamide (EBS) (KAO WAX EBP produced by Kao Corp.) and the same amounts of the same stabilizers as used in Example 4, and the mixture was treated in the same way as in Example 4 at extruder temperature of 250° C. to obtain pellets of maleimide-based resin composition. The results of performance evaluation of the obtained resin composition are shown in Table 3.

Comparative Example 16
Production of Maleimide-based Copolymer (A-9):

To a 5-litre glass-made reactor equipped with a stirrer, 200 parts of pure water, 2 parts of sodium dodecylbenzenesulfonate, 0.5 part of Rongalit, 0.005 part of ferrous sulfate and 0.01 part of disodium ethylenediaminetetraacetate were supplied and heated to 60° C., and then 30 parts of N-phenylmalemide, 55 parts of styrene, 15 parts of acrylonitrile and 0.5 part of cumene hydroperoxide were supplied dropwise over a period of 3 hours. After completion of the dropwise supply, the mixture was maintained at 60° C. for one hour and the resulting maleimide-based copolymer latex was solidified with sulfuric acid, dehydrated and dried to obtain powder of maleimide-based copolymer.

The obtained copolymer had a composition of 31 wt % N-phenylmaleimide units, 54 wt % styrene units and 15 wt % acrylonitrile units. As for the contents of residual monomers, the content of N-phenylmaleimide was 0.015% by weight and that of the volatiles other than N-phenylmaleimide was 0.86% by weight. Intrinsic viscosity of the copolymer was 0.75, its Vicat softening temperature was 142° C. and YI was 42.

Referential Example 2
Production Method of (B-4 and B-5)

The materials of the following composition were fed to a 5-litre glass-made polymerization reactor equipped with a stirrer:

| | |
|---|---|
| Polybutadiene latex (as solids) | 45 parts |
| Pure water | 140 parts |
| Dextrose | 0.35 part |
| Sodium pyrophosphate | 0.2 part |
| Ferrous sulfate | 0.006 part |
| Potassium rhodinate | 0.8 part |
| Acrylonitrile | 8.1 parts |
| Styrene | 19.9 parts |
| t-Dodecylmercaptan | 0.14 part |

The polybutadiene used was the one having a number-average particle diameter of 0.29 μm.

The mixture was heated to 60° C. and polymerized by adding 0.084 part of cumene hydroperoxide. After polymerization, the reaction product was cooled to 70° C. and, in the case of (B-4), a mixed solution of 7.9 parts of acrylonitrile, 19.1 parts of α-methylstyrene and 0.1688 part of cumene hydroperoxide was added dropwise continuously over a period of 45 minutes, and after completion of dropwise addition, 0.03375 part of cumene hydroperoxide was added to complete polymerization. In the case of (B-5), a mixed solution of 7.9 parts of acrylonitrile, 19.1 parts of α-methylstyrene, 0.1688 part of cumene hydroperoxide and 0.18 part of t-dodecylmercaptan was added dropwise continuously over a period of 45 minutes.

Production Method of (B-6 and B-7):

The materials of the following composition were fed to a 5-litre glass-made polymerization reactor equipped with a stirrer:

| | |
|---|---|
| Polybutadiene latex (as solids) | 45 parts |
| Pure water | 140 parts |
| Dextrose | 0.35 part |
| Sodium pyrophosphate | 0.2 part |
| Ferrous sulfate | 0.006 part |
| Potassium rhodinate | 0.8 part |
| Acrylonitrile | 8.1 parts |
| Styrene | 19.9 parts |
| t-Dodecylmercaptan | 0.14 part |

The polybutadiene used had a number-average particle diameter of 0.29 μm.

The mixture was heated to 60° C. and polymerized by adding 0.084 part of cumene hydroperoxide. After polymerization, the reaction mixture was cooled to 60° C. and, in the case of (B-6), a mixed solution of 7.9 parts of acrylonitrile, 19.1 parts of styrene, 0.1688 part of cumene hydroperoxide and 0.19 part of t-dodecylmercaptan was added dropwise continuously over a period of 45 minutes. In the case of (B-7), a mixed solution of 7.9 parts of acrylonitrile, 19.1 parts of styrene, 0.1688 part of cumene hydroperoxide and 0.57 part of t-dodecylmercaptan was added dropwise continuously over a period of 45 minutes.

The determination results of graft ratio and intrinsic viscosity of ungrafted polymer, as determined for each of the latexes obtained from initial polymerization and those obtained from later polymerization of each of the polymers B-4 to B-7, are shown in Table 6.

TABLE 6

| Type of rubber-reinforced resin (B) | B-4 | B-5 | B-6 | B-7 |
|---|---|---|---|---|
| Number-average particle diameter of rubber (μm) | 0.29 | 0.29 | 0.29 | 0.29 |
| AN/ST in 1st composition (parts) *AN/αMS | 29/71 | 29/71 | 29/71 | 29/71 |
| AN/ST in 2nd compostion (parts) *AN/αMS | *29/71 | *29/71 | 29/71 | 29/71 |
| 1st/2nd feed ratio (%) | 51.49 | 51.49 | 51.49 | 51.49 |
| Content of rubber moiety (parts) | 45 | 45 | 45 | 45 |
| Intrinsic viscosity after 1st polymerization | 0.63 | 0.63 | 0.64 | 0.62 |
| Intrinsic viscosity after 2nd polymerization | 0.55 | 0.52 | 0.55 | 0.51 |
| Graft ratio after 1st polymerization (%) | 15.0 | 13.4 | 16.9 | 14.6 |
| Graft ratio after 2nd polymerization (%) | 33.7 | 32.4 | 50.2 | 33.8 |

Initial polymerization is indicated by "1st" and later polymerization by "2nd".

To the obtained polybutadiene-reinforced resin latex was added 0.4 part of a phenolic antioxidant (ANTAGE W-400, trade name, produced by Kawaguchi Chemical Co., Ltd.). After mixed well, the mixture was solidified with sulfuric acid, then dehydrated and dried to obtain white powder of polybutadiene rubber-reinforced resin (B).

EXAMPLES 10–13 AND COMPARATIVE EXAMPLE 17

To 100 parts of each of the blends prepared by blending maleimide-based copolymer (A-1) and rubber-based graft copolymers (B-4–B-7) in the ratios shown in Table 7, 0.2 part of a phenolic antioxidant and 0.2 part of a phosphite type stabilizer were added as stabilizer and mixed well, and the mixture was pelletized by a 30 mmφ double-screw extruder at 250° C.

TABLE 7

| | Maleimide-based copolymer (A) | Rubber-based graft copolymer (B) | | | |
|---|---|---|---|---|---|
| | A-9 | B-4 | B-5 | B-6 | B-7 |
| Example 10 | 60 | 40 | — | — | — |
| Example 11 | 60 | — | 40 | — | — |
| Example 12 | 60 | — | — | 40 | — |
| Example 13 | 60 | — | — | — | 40 |

The results of determinations of Izod impact strength, Vicat softening temperature and heat decomposability (formation of silver streaks) of Examples 10–13 and Comparative Example 17 are shown in Table 8.

TABLE 8

|  | Izod impact strength kg · cm/cm | Vicat softening temperature °C. | Heat decomposability silver streaks |
| --- | --- | --- | --- |
| Example 10 | 24.3 | 120 | ◯ |
| Comp. Example 17 | 11.2 | 121 | △ |
| Example 11 | 25.3 | 120 | ◯ |
| Example 12 | 24.2 | 119 | ◯ |
| Example 13 | 24.8 | 117 | ◯ |

Referential Example 3
Synthesis of Conjugated Diene Type Rubber-like Copolymer

| 1,3-Butadiene | 100 parts |
| --- | --- |
| Diisopropylbenzene hydroperoxide | 0.2 part |
| t-Dodecylmercaptan | 0.5 part |
| Potassium oleate | 1 part |
| Disproportionated potassium rhodinate | 1 part |
| Dextrose | 0.3 part |
| Anhydrous sodium sulfate | 0.18 part |
| Sodium hydroxide | 0.02 part |
| Distilled water | 195 parts |

All of the above materials were supplied into a 50-litre autoclave and heated to 55° with vigorous stirring. To this mixture were added:

| Sodium pyrophospate | 0.5 part |
| --- | --- |
| Ferrous sulfate | 0.005 part |
| Distilled water | 5 parts | and polymerized at 55° C. for 8 hours to obtain a conjugated diene type rubber-like copolymer latex with a monomer conversion of 97% and a particle size of 0.08 μm.
Synthesis of Acid Group-containing Copolymer Latex

| Potassium oleate | 2.5 parts |
| --- | --- |
| Potassium diocylsulfosuccinate | 2.5 parts |
| Disodium ethylenediaminetetracetate | 0.012 part |
| Ferrous sulfate | 0.004 part |
| Rongalit | 0.5 part |
| Distilled water | 200 parts |

The above composition was supplied into a 5-litre glass-made separable flask and, after replacing oxygen in the system with nitrogen with stirring, heated to 70° C. To this, a monomer mixture consisting of:

| n-Butyl acrylate | 80 parts |
| --- | --- |
| Methacrylic acid | 20 parts |
| Cumene hydroperoxide | 0.5 part | was added dropwise over a period of 4 hours to carry out polymerization. Thereafter, the reaction mixture was maintained at 70° C. for one hour to obtain an acid group-containing copolymer latex with a monomer conversion of 97%.
Synthesis of Rubber-based Graft Copolymers [B-8–B-9]
Ten parts (as solids) of the above conjugated diene type rubber-like copolymer latex was supplied to a 20-litre separable flask. To this, 0.2 part (as solids) of the above acid group-containing copolymer latex was added with stirring. The mixture was maintained at it was for 30 minutes and then subjected to a particle-enlarging operation by adding 160 parts of distilled water to obtain a particle-enlarged conjugated diene type rubber-like copolymer having an average particle diameter of 0.36 μm. To this copolymer, a monomer mixture consisting of:

| n-Butyl acrylate | 40 parts |
| --- | --- |
| Allyl methacrylate | 0.15 part |
| t-Butyl hydroperoxide | 0.12 part | and a crosslinking agent of the amount shown in Table 3 were added and stirred well. Then 0.2 part of sodium N-lauroylsarcosinate and 3 parts of distilled water were supplied and the inside atmosphere of the system was replaced with nitrogen to remove oxygen. The internal temperature of the system was raised to 45° C. and at this point the following composition was supplied.

When the polymerization started and the internal temperature rose to about 70° C., the mixture was maintained at 75° C. for 90 minutes with stirring to carry out seed polymerization. A small quantity of the obtained latex was sampled out, freeze-solidified, separated and dried, and the gel content was measured for evaluation.

| Rongalit | 0.25 part |
| --- | --- |
| Ferrous sulfate | 0.0002 part |
| Disodium ethylenediaminetetraacetate | 0.0006 part |
| Distilled water | 3 parts |

Further, the following composition was supplied and the mixture was heated to 75° C. with stirring:

| Sodium N-lauroylsarcocinate | 1.2 part |
| --- | --- |
| Rongalit | 0.4 part |
| Ferrous sulfate | 0.001 part |
| Disodium ethylenediaminetetraacetate | 0.003 part |
| Distilled water | 10 parts |

Then the following monomer mixture was added dropwise over a period of 120 hours to carry out graft polymerization. After the end of the dropwise addition of the monomer mixture, the mixture was maintained as it was for one hour to obtain a graft copolymer latex. This graft copolymer latex was solidified by putting it into a dilute sulfuric acid solution, then dehydrated, washed and dried to obtain powder of graft copolymers B-2 and B-3.

| Acrylonitrile | 15 parts |
| --- | --- |
| Styrene | 35 parts |
| t-Butyl hydroperoxide | 0.3 part |
| n-Octylmercaptan | 0.1 part |

Synthesis of Copolymer (C)

| Acrylonitrile | 30 parts |
| --- | --- |
| Styrene | 70 parts |
| Azobisisobutylonitrile | 0.15 part |
| t-Dodecylmercaptan | 0.6 part |

| | |
|---|---|
| Calcium phosphate | 0.5 part |
| Distilled water | 150 parts |

The above composition was supplied to a 100-litre autoclave and stirred vigorously. After confirming dispersion in the system, the mixture was heated to 75° C. and polymerized over a period of 3 hours. Thereafter the mixture was heated to 110° C. and aged for 30 minutes. After cooled, the mixture was dehydrated, washed and dried to obtain a bead copolymer (C). Its weight-average molecular weight measured by gel permeationchromatography (GPC) was 92,000 on polystyrene basis.

EXAMPLES 14–16 AND COMPARATIVE EXAMPLE 18
Preparation of Thermoplastic Resin Composition Graft copolymer (B), maleimide-based copolymer (A) and copolymer (C), each of a specified amount shown in Table 9, were supplied together with the following materials to a Henschel mixer and blended:

| | |
|---|---|
| ADECASTAB AO-50 (produced by Asahi) Electro-Chemical Co., Ltd.) | 0.3 part |
| ADECASTAB PEP-36 (produced by Asahi Electro-Chemical Co., Ltd.) | 0.3 part |
| ADECASTAB LA-63P (produced by Asahi Electro-Chemical Co., Ltd.) | 1 part |
| Ethylene bis-stearamide | 1 part |
| Magnesium stearate | 0.3 part |
| Silicone oil SH 200 (produced by Toray Dow Corning Silicone Co., Ltd.) | 0.03 part |

Then the above mixture was melted and kneaded at 260° C. by using a screw extruder and pelletized by a pelletizer. The obtained pellets were injection molded into test pieces for evaluation and their properties were evaluated. The results are shown in Table 9.

TABLE 9

| | Rubber-based graft copolymer (B) | | | | Maleimide-based copolymer (A) | |
|---|---|---|---|---|---|---|
| | Crosslinking agent*[1] | | Gel content in rubber | | | |
| | Type | (parts) | moiety | Parts | Type | Parts |
| Example 14 | B-8 | 0.30 | 94 | 40 | A-1 | 60 |
| Example 15 | B-9 | 0.16 | 91 | 40 | A-1 | 60 |
| Comp. Example 18 | B-8 | 0.30 | 94 | 40 | A-2 | 60 |
| Example 16 | B-8 | 0.30 | 94 | 40 | A-1 | 50 |

| Copolymer (C) Parts | Iz (kg · cm/cm) | MI (g/10 min.) | VST (° C.) | Gloss (%) | Weather resistance (gloss retention (%)) |
|---|---|---|---|---|---|
| — | 11 | 4.6 | 123 | 90 | 91 |
| — | 11 | 4.3 | 122 | 85 | 90 |
| — | 10 | 2.2 | 125 | 90 | 89 |
| 10 | 14 | 8.3 | 117 | 92 | 91 |

*[1]: Butylene glycol diacrylate was used.

INDUSTRIAL APPLICABILITY

The maleimide-based copolymer and resin compositions comprising said copolymer according to the present invention have excellent heat resistance as well as excellent molding workability and can be used as molded products in the various fields of industry such as electronic/electrical appliances and automobiles.

We claim:

1. A maleimide copolymer comprising 15 to 65% by weight of maleimide monomer units (a-1), 35 to 85% by weight of aromatic vinyl monomer units (a-2) and 35% by weight or less of other vinyl monomer units (a-3), the total of the units (a-1)–(a-3) being 100% by weight wherein,
   (I) the content of residual maleimide monomer in said copolymer is 0.1% by weight or less, and the content of whole volatiles other than the maleimide monomer is 0.5% by weight or less;
   (II) a compound obtained from at least one monomer selected from the group consisting of a maleimide monomer, an aromatic vinyl monomer and other vinyl monomers, the weight-average molecular weight of said compound measured by gel permeation chromatography (GPC) being from about 200 to 1,000, is contained in an amount of 2 to 10% by weight;
   (III) said copolymer has a yellow index of 30 or less; and
   (IV) said copolymer has an intrinsic viscosity of from 0.3 to 1.5.

2. A maleimide-based copolymer according to claim 1, wherein at least one monomer in (II) above is a maleimide monomer.

3. A maleimide resin composition comprising a maleimide copolymer (A) of claim 1 and a rubber graft polymer (B) obtained by polymerizing at least one vinyl monomer selected from the group consisting of an aromatic vinyl monomer, an acrylic or methacrylic ester monomer and a derivative thereof and a vinyl cyanide monomer in the presence of 5 to 80% by weight of a rubber polymer.

4. A maleimide resin composition according to claim 3, wherein the rubber polymer is a butadiene rubber.

5. A maleimide resin composition according to claim 4, wherein at least one monomer in (II) above is a maleimide monomer.

6. A maleimide resin composition according to claim 5, comprising 40 to 95 parts by weight of component (A), 60 to 5 parts by weight of component (B), and other hard thermoplastic resin (C) in an amount of 0 to 300 parts by weight based on the total 100 parts by weight of said component (A) and component (B).

7. A maleimide resin composition according to claim 3, wherein the rubber graft copolymer (B) is a graft copolymer obtained by polymerizing 7.5 to 29.25% by weight of acrylonitrile (b-2) and 16.5 to 48.75% by weight of styrene (b-3) in the presence of 35 to 70% by weight of a butadiene rubber (b-1), the total of the components (b-1) to (b-3) being 100% by weight, and (b-2)/((b-2)+(b-3))=0.25–0.45, wherein number average particle diameter of the butadiene rubber in said graft copolymer is 0.15 to 0.4 μm, intrinsic viscosity of the ungrafted polymer contained in said graft copolymer is 0.4 to 1.2 dl/g, and graft ratio of said graft copolymer is 20 to 80%.

8. A maleimide resin composition according to claim 6, wherein the rubber graft copolymer (B) is a graft copolymer obtained by polymerizing 7.5 to 29.75% by weight of acrylonitrile (b-2) and 16.5 to 48.75% by weight of styrene (b-3) in the presence of 35 to 70% by weight of butadiene rubber (b-1), the total of components (b-1) to (b-3) being 100% by weight, and (b-2)/((b-2)+(b-3)) being 0.25–0.45, wherein number-average particle diameter of the butadiene rubber in said graft copolymer is 0.15 to 0.4 µm, intrinsic viscosity of the ungrafted polymer contained in said graft copolymer is 0.4 to 1.2 dl/g, and graft ratio of said graft copolymer is 20 to 80%.

9. A maleimide resin composition according to claim 3, wherein the rubber graft copolymer (B) is a graft copolymer obtained by polymerizing 10 to 40% by weight of acrylonitirle, 30 to 90% by weight of styrene and 45% by weight or less of α-methylstyrene in the presence of 35 to 70% by weight of a butadiene rubber, wherein (I) number-average particle diameter of the butadiene rubber in said graft copolymer is from 0.15 to 0.4 µm;

(II) said graft copolymer is obtained by polymerizing 40 to 60 parts by weight of a monomer mixture (d) in which the weight ratio given by (weight of acrylonitrile)÷((weight of acrylonitrile)+(weight of styrene)) is 0.1 to 0.4, and then further polymerizing 40 to 60 parts by weight of a monomer mixture (e) in which the weight ratio given by (weight of acrylonitrile)÷((weight of acrylonitrile)+(weight of styrene or α-methylstyrene)) is 0.1 to 0.4, the total of monomer mixture (d) and monomer mixture (e) being 100 parts by weight;

(III) intrinsic viscosity of ungrafted polymer contained in said graft polymer is 0.5 to 1.3 dl/g after polymerization of monomer mixture (d) and 0.3 to 1.0 dl/g after polymerization of monomer mixture (e), said intrinsic viscosity being lower after the polymerization of (e) than after the polymerization of (d); and (IV) graft ratio of said graft polymer is 3 to 80% after the polymerization of monomer mixture (d) and 20 to 70% after the polymerization of monomer mixture (e).

10. A maleimide resin composition according to claim 5, comprising 5 to 95% by weight of component (A), 5 to 95% by weight of component (B), and 0 to 75% by weight of other thermoplastic resin (C), wherein weight fraction of the rubber moiety given by ((B)×(weight ratio of butadiene rubber))/((A)+(B)+(C)) is 3 to 30% by weight.

11. A maleimide resin composition according to claim 3, wherein rubber graft copolymer (B) is a graft copolymer composed of 40 to 70% by weight of a rubber moiety comprising one composite rubber consisting of a conjugated diene rubber copolymer and an acrylic ester rubber copolymer, or a rubber moiety comprising an acrylic ester rubber-like copolymer and a composite rubber consisting of a conjugated diene rubber copolymer and an acrylic ester rubber copolymer, and 60 to 30% by weight of a graft moiety comprising a copolymer of 15 to 45% by weight of vinyl cyanide monomer units and 85 to 55% by weight of aromatic vinyl monomer units.

12. A maleimide resin composition according to claim 11, comprising 40 to 85 parts by weight of is component (A), 15 to 50 parts by weight of component (B), and 0 to 40 parts by weight of copolymer (C) consisting of 15 to 45% by weight of the vinyl cyanide monomer units and 85 to 55% by weight of the aromatic vinyl monomer units, the total of components (A), (B) and (C) being 100 parts by weight, wherein the gel content as toluene insolubles of the rubber moiety in component (B) is 85% by weight or more.

* * * * *